US010564023B2

(12) United States Patent
Schrier et al.

(10) Patent No.: US 10,564,023 B2
(45) Date of Patent: Feb. 18, 2020

(54) FRICTION MEASUREMENT FOR ELECTROMECHANICAL LIQUID LEVEL GAUGES

(71) Applicant: Honeywell International Inc., Morris Plains, NJ (US)

(72) Inventors: Ronald Schrier, Delft (NL); Dirk Van Duijn, Katwijk (NL); Jan De Goffau, Barendrecht (NL); Stephan Walraven, Haarlem (NL)

(73) Assignee: Honeywell International Inc., Morris Plains, NJ (US)

( * ) Notice: Subject to any disclaimer, the term of this patent is extended or adjusted under 35 U.S.C. 154(b) by 675 days.

(21) Appl. No.: 15/250,277

(22) Filed: Aug. 29, 2016

(65) Prior Publication Data

US 2018/0058895 A1 Mar. 1, 2018

(51) Int. Cl.
*G01F 23/00* (2006.01)
*B65G 43/00* (2006.01)

(52) U.S. Cl.
CPC ...... *G01F 23/0076* (2013.01); *G01F 23/0023* (2013.01); *B65G 43/00* (2013.01); *G05B 2219/42271* (2013.01)

(58) Field of Classification Search
CPC .................. G01F 23/0023; G01F 25/0061
See application file for complete search history.

(56) References Cited

U.S. PATENT DOCUMENTS

| 4,786,846 | A | 11/1988 | Uchida | |
|---|---|---|---|---|
| 5,012,589 | A * | 5/1991 | Remion | G01F 23/0023 318/482 |
| 5,243,860 | A | 9/1993 | Habart | |
| 2009/0122885 | A1* | 5/2009 | Anilkumar | G01R 19/0023 375/260 |
| 2012/0073354 | A1* | 3/2012 | Joosten | G01F 23/0023 73/1.73 |
| 2013/0269432 | A1 | 10/2013 | Brutschin et al. | |
| 2016/0194158 | A1* | 7/2016 | Senn | B65G 45/02 73/865.8 |

FOREIGN PATENT DOCUMENTS

| JP | 2010066167 A | 3/2010 | |
|---|---|---|---|
| WO | 2016037815 A1 | 3/2016 | |
| WO | WO-2016037815 A1 * | 3/2016 | ......... G01F 25/0061 |

* cited by examiner

Primary Examiner — Michael J Dalbo

(57) ABSTRACT

An electromechanical servo gauge includes a displacer on a wire from a drum for causing a torque on the drum, a servo motor coupled by a drive shaft for rotating the drum, wherein a change in a liquid level moves the ESG out of balance, and a force transducer is positioned for measuring the torque on the drum and converting the torque into a physical quantity. The processor implements an automatic friction determination algorithm. A first move moves the displacer in a first direction for ≥1 motor step(s) to a first position and first physical quantity data including a first physical quantity (Q1) is measured by the transducer. Second moving moves the displacer in an opposite direction ≥1 step(s) to reach a second displacer position and second physical quantity data including a second physical quantity (Q2) is measured. A hysteresis measure is determined from the first and second physical quantity.

16 Claims, 5 Drawing Sheets

```
100
```

| 101 | PROVIDING AN ESG INCLUDING A CONTROLLER HAVING A PROCESSOR, A DISPLACER HAVING A NEGATIVE BUOYANCY SUSPENDED ON A MEASURING WIRE FROM A MEASURING DRUM FOR CAUSING A TORQUE ON THE DRUM HAVING A SERVO MOTOR WITH A GEAR (MOTOR) COUPLED BY MOVING PARTS INCLUDING A DRIVE SHAFT AND BALL BEARINGS ASSOCIATED WITH THE SERVO MOTOR FOR ROTATING THE DRUM. A FORCE TRANSDUCER IS POSITIONED FOR MEASURING A TORQUE ON THE DRUM AND CONVERTING THE TORQUE INTO A PHYSICAL QUANTITY. THE PROCESSOR INCLUDES AN ASSOCIATED MEMORY STORING A DISCLOSED FRICTION DETERMINATION ALGORITHM (ALGORITHM) EXECUTED BY THE PROCESSOR IMPLEMENTING STEPS 102–106. |

↓

102 — FIRST MOVING THE DISPLACER IN A FIRST DIRECTION FROM AN INITIAL DISPLACER POSITION FOR AT LEAST ONE FULL STEP OF THE SERVO MOTOR TO REACH AT LEAST A FIRST DISPLACER POSITION.

↓

103 — OBTAINING FIRST PHYSICAL QUANTITY DATA INCLUDING AT LEAST A FIRST PHYSICAL QUANTITY (Q1) MEASURED BY THE FORCE TRANSDUCER WHILE THE DISPLACER IS AT THE FIRST DISPLACER POSITION.

↓

104 — SECOND MOVING THE DISPLACER IN AN OPPOSITE DIRECTION RELATIVE TO THE FIRST DIRECTION FOR AT LEAST ONE FULL STEP OF THE SERVO MOTOR TO REACH AT LEAST A SECOND DISPLACER POSITION.

↓

105 — OBTAINING SECOND PHYSICAL QUANTITY DATA INCLUDING A SECOND PHYSICAL QUANTITY (Q2) MEASURED BY THE FORCE TRANSDUCER WHILE THE DISPLACER IS AT THE SECOND DISPLACER POSITION.

↓

106 — DETERMINING A HYSTERESIS MEASURE FROM THE FIRST AND SECOND PHYSICAL QUANTITY DATA.

FIG. 1

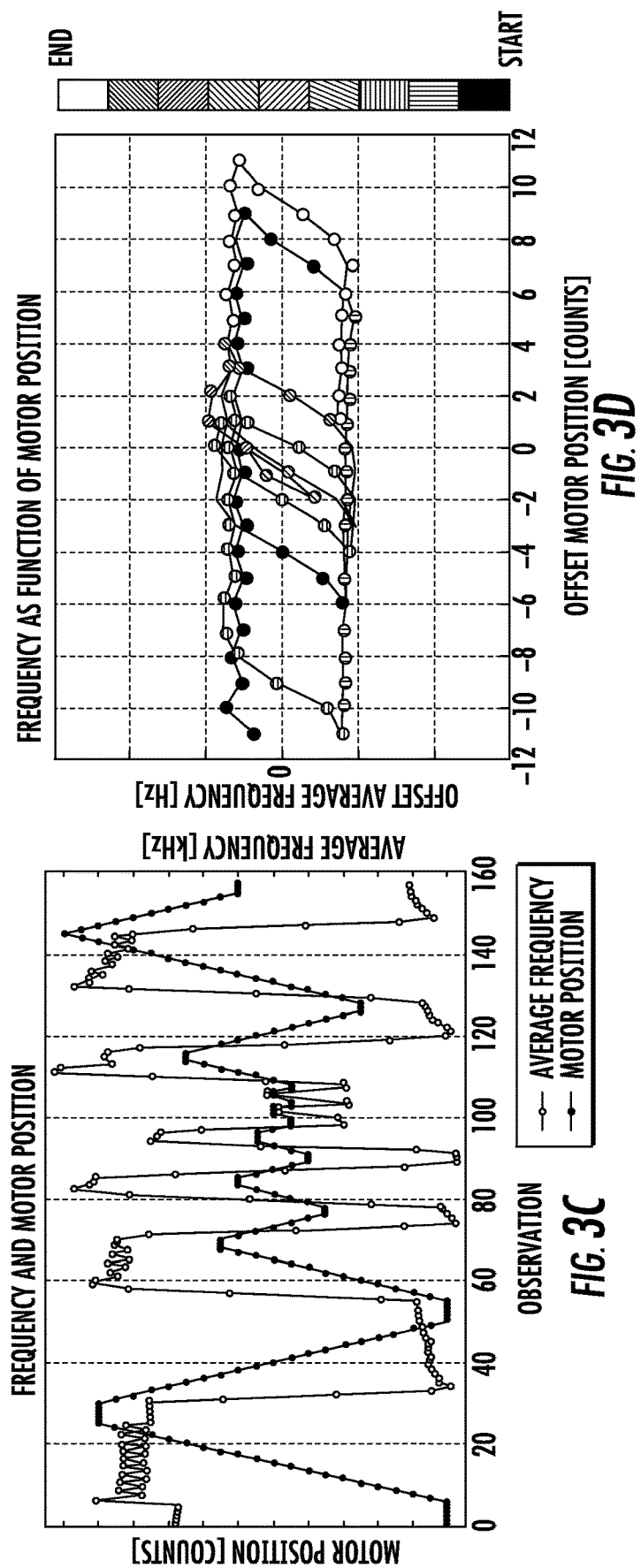

FRICTION MEASUREMENT FOR ELECTROMECHANICAL LIQUID LEVEL GAUGES

FIELD

Disclosed embodiments relate to electromechanical liquid level gauges that use the servo principle.

BACKGROUND

Electromechanical liquid level servo gauges (ESGs) are used for the accurate measurement of product level and the water interface level in bulk storage tanks used for typical hydrocarbons (often referred to as fuel and oil) as well as for a variety of other liquid chemicals. These products range from very light chemicals, including so-called LPG's (mixtures of propane and butane or even liquefied natural gas (LNG)) to all types of refined products such as naphtha, gasoline, diesel, jet fuels, lubricants and all types of chemicals, both pure and mixed.

The servo principle is based on the measurement of the apparent weight of a displacer that is within the liquid in the tank. The displacer is a mechanical body suspended on a strong thin measuring wire, where the displacer material has a higher density than the liquid to be measured. The measurement wire is wound on a high accuracy machined grooved drum with a calibrated circumference that is coupled to a detection shaft that is coupled to a worm wheel (or servo motor) by ball bearings. The apparent weight resulting from the weight of the displacer minus the weight of the displaced liquid product is measured and is then used by a computing device such as a microcontroller with the servo motor used to rotate drum in order to position the displacer at a different height in the tank.

By rotating the drum the wire is spooled up or paid out into the tank and the displacer is raised or lowered until the measured apparent weight equals the programmed set point. For safety reasons typically a magnetic coupling (using pole pairs) may be located between drum and electronics (motor, microcontroller, electronics, etc.) as many of the liquids products which are commonly stored in bulk storage tanks are flammable and typically need an explosion safe design. The displacer being denser as compared to the density of the liquid product in the tank is basically kept at the same level using Archimedes law which indicates that the upward buoyant force that is exerted on a body immersed in a fluid, whether fully or partially submerged, is equal to the weight of the fluid that the body displaces.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize one limitation of conventional electromechanical liquid level servo gauges (ESGs) is the inability to measure friction in the ESG while in the field, where extra friction can degrade the ESG's level measurement accuracy. Moreover, over time the friction may increase for an ESG installed in the field. This means that there is no indication provided when service of the ESG is needed, such as to initiate maintenance to oil the ball bearings associated with the servo motor. Another related problem is that there is no known test to check the behavior of new ball bearings during manufacturing of ESGs.

Disclosed embodiments also simplify maintenance of the ESG. A servo gauge being a mechanical device needs maintenance and service engineers to check to determine whether the bearings are still in good shape. Disclosed embodiments greatly ease diagnostics of the bearings and can be used to add self-diagnostics, where the ESG itself can indicate it needs maintenance.

Disclosed embodiments solve this unmet need for friction measurement and diagnostics for ESGs by providing automatic methods of friction measurement of an ESG including the ball bearings associated with the servo motor and positioning bearings on the drive shaft for holding the drive shaft and keeping the drive shaft positioned in the housing. Disclosed embodiments are applicable when the ESG is installed (on site, e.g., of a plant) and also during manufacturing of the ESG to prove that the friction is at an acceptably low level before shipping the ESG to a customer.

One disclosed embodiment comprises an ESG including a displacer on a wire from a measuring drum for causing a torque on the drum, a servo motor with a gear coupled by a drive shaft for rotating the drum, wherein a change in a liquid level causes a change in a counterforce to move the ESG out of balance, and a force transducer is positioned for measuring the torque on the drum and for converting the torque into a physical quantity such as frequency. Alternatively, the torque can generally be converted to another physical quantity such as a voltage or a current. As used herein a "physical quantity" is a physical property that can be quantified, where a physical property is any property that is measurable, whose value describes a state of a physical system, such as within a tank gauging system.

A processor implements a disclosed automatic friction determination algorithm. A first move moves the displacer in a first direction for ≥1 motor step(s) to a first position and first physical quantity data including at least a first physical quantity (Q1) is then measured by the transducer. Second moving moves the displacer in an opposite direction ≥1 step(s) to reach a second displacer position, and second physical quantity data including at least a second physical quantity (Q2) is then measured by the transducer. A hysteresis measure (e.g., a hysteresis value) is then determined from the first and second physical quantity data. In one embodiment Q1 is the total physical quantity change (or difference) resulting from moving the displacer in one direction, and Q2 is the total physical quantity shift resulting from moving the displacer in the other direction, and the absolute value of the difference, |Q1−Q2|, is calculated to determine a hysteresis value which indicates the level of friction.

BRIEF DESCRIPTION OF THE DRAWINGS

FIG. 1 is a flow chart that shows steps in an example method of automatically measuring the friction of an ESG, according to an example embodiment.

FIGS. 3C and 3D show the motor position and average frequency data after lubrication of the ball bearings of the ESG.

DETAILED DESCRIPTION

Figure 2A:
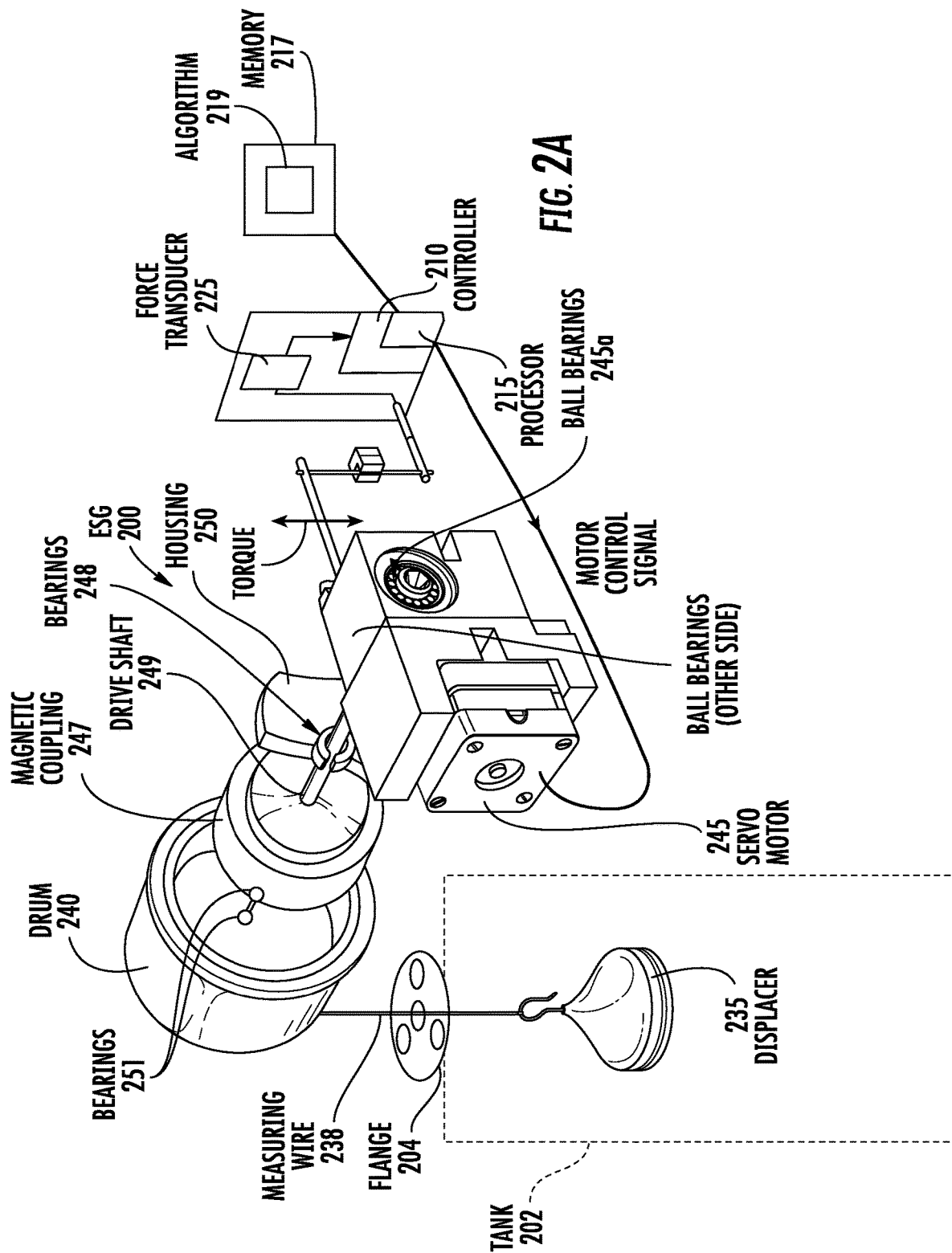
FIG. 2A is a depiction of an example ESG implementing automatic measuring of friction, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Disclosed embodiments include methods for automatically measuring the friction in the ESG including the ball bearings associated with the servo motor. The wire position is generally set to start with the displacer above the liquid (or other material) in the tank. The displacer is commanded in the upward or downward direction, typically ≥8 motor steps. The physical quantity (e.g., frequency) of the force transducer is then measured to provide first physical quantity data including at least a first physical quantity (Q1). The displacer is commanded in the opposite direction, again typically ≥8 motor steps. The physical quantity of the force transducer is again measured to provide second physical quantity data including at least a second physical quantity (Q2). A hysteresis measure (e.g., a hysteresis value) is determined from the first and second physical quantity data. As described above, in one embodiment Q1 is the total physical quantity change (or difference) resulting from moving the displacer in one direction, and Q2 is the total physical quantity shift resulting from moving the displacer in the other direction, and |Q1−Q2| is calculated to determine a hysteresis value which indicates a level of friction or state of the bearings, such as low, moderate, high, or very high (or good, fair, poor, bad, and very bad).

FIG. 1 is a flow chart that shows steps in a method 100 of automatically measuring friction of an ESG, according to an example embodiment. The tank can represent any suitable structure for receiving and storing at least one liquid or other material (e.g., a powder). The tank can, for example, represent an oil storage tank or a tank for storing other liquid(s) or other material(s). The tank can also have any suitable shape and size. Further, the tank can form part of a larger structure. The larger structure can represent any fixed or movable structure containing or associated with one or more tanks, such as a movable tanker vessel, railcar, or truck or a fixed tank farm.

Step 101 comprises providing an ESG including a controller having a processor, a displacer having a negative buoyancy suspended on a measuring wire from a spiral grooved measuring drum for causing a torque on the drum having a servo motor with a gear (motor) coupled by moving parts including a drive shaft and ball bearings associated with the servo motor for rotating the drum arranged to balance a weight of the displacer in a tank where a change in a level of a liquid in the tank causes a change in a counterforce to move the ESG out of balance. A force transducer is positioned for measuring a torque on the drum and converting the torque into a physical quantity such as a frequency, voltage or current. The processor includes an associated memory storing a disclosed friction determination algorithm (algorithm) executed by the processor implementing steps 102-106 described below.

Step 102 comprises first moving the displacer in a first direction from an initial displacer position that is generally above the liquid level for at least one full (complete) step of the servo motor to reach at least a first displacer position. The first direction can be upward or downward provided the displacer remains above the liquid. The number of steps is typically a plurality of steps, as noted above typically ≥8. There is generally no advantage is performing more steps than the hysteresis has effect. In practice it has been recognized that the size of the hysteresis varies from approximately 4 to 8 steps. A single step is generally not a good measure for the total hysteresis, but the size of the step may still provide useful information Due to friction, the inner magnets do not rotate at the motor step, instead the motor itself moves a little, introducing an additional force on the force sensor. For good bearings though, one sees that the first frequency step is less, due to less friction the motor winds itself less and some of the motion is already transmitted to the axis with the inner magnets. So that the first step can provide some information (e.g. really good bearings), but generally not enough information as the step is limited to a certain force. So one step can tell you if the bearings are in good operating condition, but cannot generally be used to evidence bad (high friction) bearings. The processor monitors an output of a torque sensor which senses a torque on the drum. The torque sensor converts the torque signal into a physical quantity such as a frequency that is coupled to the processor which functions as a Servo Processor Unit (SPU).

Step 103 comprises obtaining first physical quantity data including at least at least a first physical quantity (Q1) measured by the force transducer while the displacer is at the first displacer position. Step 104 comprises second moving of the displacer in an opposite direction relative to the first direction for at least one full step of the servo motor to reach at least a second displacer position. Step 105 comprises obtaining second physical quantity data including at least a second physical quantity Q2 measured by the force transducer while the displacer is at the second displacer position. Step 106 comprises determining a hysteresis measure (e.g., a hysteresis value) from the first and second physical quantity data, such as from Q1 and Q2. Q1 can be the total physical quantity change (or difference) measured resulting from moving the displacer in one direction, and Q2 can be the total physical quantity shift measured resulting from moving the displacer in the other direction, and |Q1−Q2| can be calculated to determine a hysteresis value which indicates the level of friction.

The hysteresis measure from the first and second physical quantity data can comprise a hysteresis curve that is described by a number of parameters, such as |F1−F2| in the case of frequency. However, the hysteresis measure can comprise the number of motor steps it takes to reach that physical quantity difference or physical quantity differences at first steps in respective directions. Yet another approach can be to compare complete respective physical quantity curves.

The hysteresis measure (e.g., a hysteresis value) can be used to decide on whether to perform service on the ESG to reduce the friction, such as oiling the ball bearings, or to replace the ball bearings. Automatic actions based on the hysteresis measure can include automatically adjusting the ESG rendered tank readings for friction based on the physical quantity data including the calculation of product level, water level or any other interface level, alarm levels, volume, mass and density. Automatic actions based on the hysteresis value can also include self-diagnostics (e.g., to determine when to oil the ball bearings), such as using Industrial Internet of Things (IIoT) to deliver diagnostics and for reporting.

It is noted that although the torque is measured by electronics, it need not be measured directly. In typical applications one may not want to have the sensitive measurement electronics in the same space as where the product and product vapors are. To isolate the sensitive measurement electronics, the torque sensor can include a magnetic coupling formed by two coaxial magnets located between the drum and motor.

In the case the physical quantity is frequency, a hysteresis value of about 30 Hz between the frequency difference for up and down displacer moves for one specific ESG can mean that the friction of the ESG is low. If the hysteresis value for this ESG increases to 60 Hz or more then service for the ESG is generally needed, such as oiling the ball bearings. The figures of 30 Hz and 60 Hz in a frequency difference differential are example values which can be changed based on field results for the particular ESG. This technique can be applied when the ESG installed (on site) and also during manufacturing of the ESG to evidence the friction is at an acceptably low level so that the ESG will generally be operating (e.g., calculating liquid levels) accurately. The graphs in FIGS. 3C and 3D described below in the Examples shows a sawtooth waveform in the frequency curve in the case of good bearings (providing low friction) when the displacer is moved upwards. This sawtooth waveform has been found to be absent or at least not apparent when the bearings are in worse condition (also see the Examples section). The presence or lack of presence of a sawtooth waveform can thus be used to determine the condition status of the bearings inside the ESG.

Disclosed embodiments can be implemented in the existing firmware of the ESG. No hardware change is generally needed to implement disclosed embodiments. Disclosed friction testing can be executed autonomously if the liquid level in the tank is stable (no loading/unloading) at predetermined time intervals. In addition, a new gauge command can be introduced to execute the friction test on demand of individual (e.g. a service engineer or technician). All or part of the hysteresis measures such as hysteresis values which have been measured/determined can be archived in memory of the ESG along with an optional timestamp. This archiving of hysteresis measures can be used to provide a way to determine the friction change over time for an ESG.

FIG. 2A shows an example ESG 200 that includes a controller 210 comprising a processor 215 having an associated memory 217 storing a disclosed algorithm 219 that implements a disclosed method of automatically measuring the friction of an ESG programmed to implement the algorithm 219, according to an example embodiment. The processor 215 can comprise a microprocessor, microcontroller, field programmable gate array, digital signal processor, or other processing or control device.

A force transducer 225 is shown on a common PCB board with the processor 215. The force transducer 225 can convert a torque on the drum 240 into a physical quantity such as a frequency, voltage or current, that is coupled to an input of the controller 210 acting as a Servo Processor Unit (SPU) which renders a torque measurement.

ESG 200 includes a displacer 235 within a tank 202 that has a flange 204. The displacer 235 is suspended on a measuring wire 238 from a drum 240 that extends through the flange 204 for causing a torque on the drum 240. The displacer shape and displacer dimensions are generally known. A servo motor with a gear (servo motor) 245 having associated ball bearings 245a is coupled by a drive shaft 249 to rotate the drum 240 to balance a weight of the displacer 235 in the tank 202 having a liquid therein (not shown). Other bearings 248 are shown between the drive shaft 249 and the housing 250. There are also bearings 251 (e.g., comprising Polytetrafluoroethylene (PTFE)) at the drum's 240 shaft. These bearings 251 carry the drum 240 with outer magnets, which is in another compartment than the motor and electronics. The ball bearings 245a and bearing 248 carry the drive shaft with inner magnets and are located in the motor and electronics compartment, and positioned between the drive shaft and housing.

An equilibrium condition exists when the displacer 235 is at a top surface of the liquid, wherein a change in the liquid level causes a change in a counterforce to move the ESG 200 out of balance. As noted above, although not shown, any force which acts via the measuring wire 238 on the drum 240 sensed by force transducer 225 can be transferred as a torque to processor side of the ESG 200 using a magnetic coupling 247.

Figure 2B:
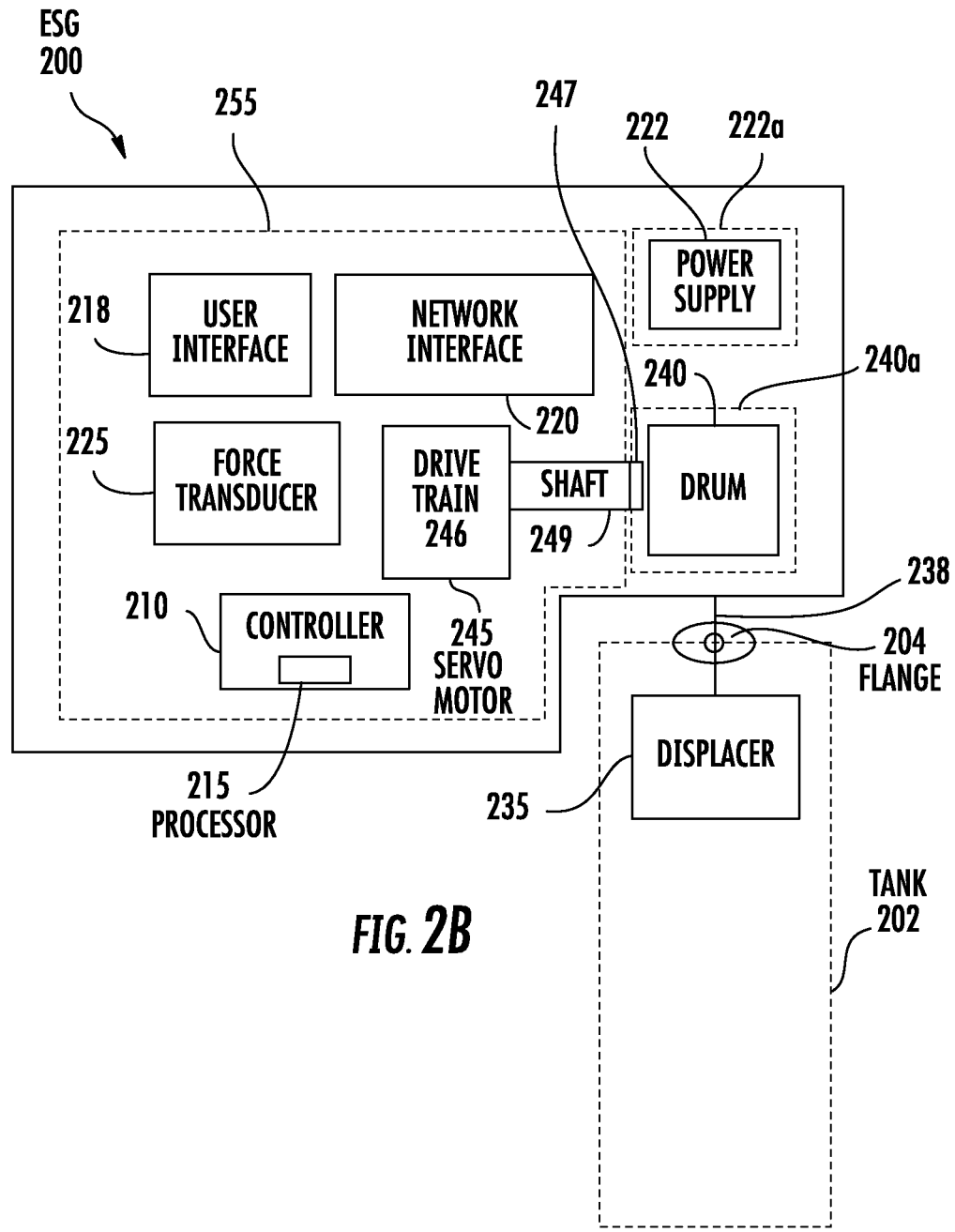
FIG. 2B is a block diagram of an example ESG implementing automatic measuring of friction, according to an example embodiment.

FIG. 2B is a block diagram illustration of an example ESG 200, according to an example embodiment. As shown in FIG. 2B, the ESG 200 can included three compartments, a drum compartment 240a, a drive compartment 255, and a power supply compartment 222a. The drum compartment 240a includes the drum 240 on which a wire 238 is wound. The drum 240 can be rotated in one direction by the drive compartment 255 to lower the displacer 235, and the drum 240 can be rotated in another direction by the drive compartment 255 to raise the displacer 235. The drum 240 includes any suitable structure for raising and lowering the displacer 235 via rotation.

The drive compartment 255 includes a motor 245 including a drive train 246, which imparts rotation to the drum 240 via a drive shaft 249. For example, the drive train 246 or drive shaft 249 could generate a magnetic field, and a magnetic coupling 247 can be used to convey torque between the drive shaft 249 and the drum 240. In these embodiments, no direct connection may be needed between the drum compartment 240a and the other compartments 255, 222a. However, other techniques for causing rotation of the drum 240 can be used, such as when the drive shaft 249 is physically connected to the drum 240. The drive train 246 includes any suitable structure for imparting rotation to the drum 240. In particular embodiments, the drive train 246 comprises a stepper motor that causes the drum 240 to rotate in specified steps, meaning the drum 240 does not rotate freely but instead in defined amounts or "steps." Each step of the servo motor 245 should therefore impart a known amount of rotation to the drum 240. In these embodiments, since the drum 240 has a known diameter or circumference, the length of the wire 238 that is dispensed or collected during a single step rotation can be known with a high degree of certainty.

The drive compartment 255 also includes a force transducer 225 which identifies the torque induced on the drum 240 by the weight of displacer 235. When the displacer 235 is dangling from the wire 238, the measured torque is higher. When the displacer 235 is completely or partially submerged in the material in the tank, the measured torque is lower. The force transducer 225 generally identifies the torque on the drum 240 by measuring the torque on the shaft 249.

ESG 200 is shown including a user interface 218 and a network interface 220 in the drive compartment 255. The user interface 218 facilitates communications between the ESG 200 and an operator or other plant personnel. The user interface 218 can provide data from an operator to the controller 210, such as a command to initiate level measurements, a command to raise or lower the displacer 235, or a command to enable or disable testing of the ESG 200. The user interface 218 can also allow the personnel to review measurement data generated by the ESG 200 including disclosed friction data. The user interface 218 may include any suitable interface for interacting with one or more users, such as a keypad or keyboard and a display.

The network interface 220 facilitates the communication of data to or from the ESG 200. For example, the network interface 220 could receive level measurements calculated by ESG 200 and transmit the level measurements to one or more external destinations. The network interface 220 includes any suitable structure supporting wired or wireless communications, such as an Ethernet interface, an RF transceiver, or other wired or wireless interface.

The power supply compartment 222a includes a power supply 222, which provides operating power for the ESG 200. The power supply 222 can provide power to various components of the drive compartment 255. Depending on the implementation, the power supply 222 may or may not supply power to the drum compartment 240a. The power supply 222 can include any suitable power providing structure, such as a battery, fuel cell, or solar cell.

Examples

Disclosed embodiments are further illustrated by the following specific Examples, which should not be construed as limiting the scope or content of this Disclosure in any way. In this example the force transducer 225 converts a torque on the drum 240 into a frequency, although as described above the force transducer 225 can convert a torque on the drum 240 into another physical quantity such as a voltage or a current. Moreover, in this Example the displacer 235 was moving up and down above the liquid which provide the clearest results. However, this is not necessary though, as one can also move the displacer 235 at the interface or below the interface.

Figure 3B:
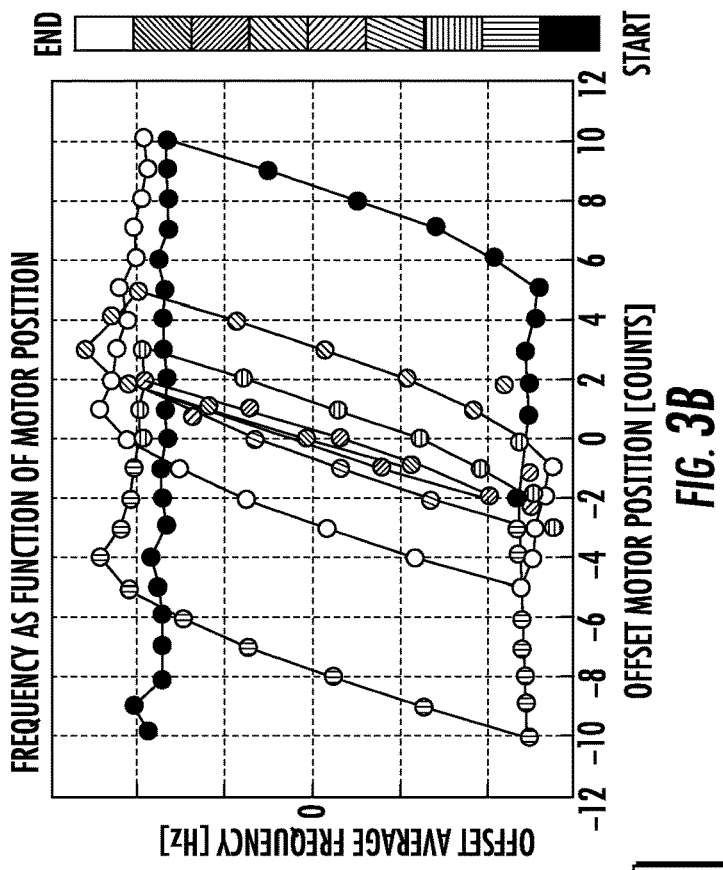
FIGS. 3A and 3B show motor position and average frequency data before lubrication of the ball bearings of the ESG.
Figure 3A:
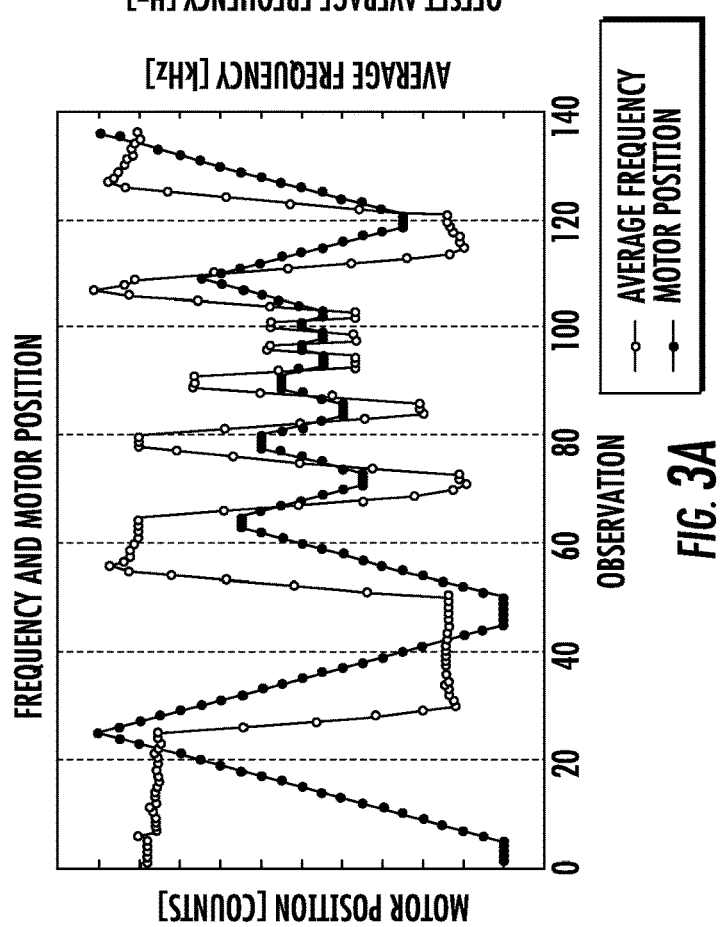

During a feasibility study for disclosed ESG friction measurement software for an 854 ATG servo Advanced Tank Level gauge (a microprocessor controlled tank level gauges from Honeywell Enraf) it was verified one can monitor the condition of the ball bearings 245a by monitoring the hysteresis curves of the ESG generated by moving the displacer 235 up and down in air. FIGS. 3A and 3B show motor position and average frequency data before lubrication of the ball bearings of the ESG, and FIGS. 3C and 3D show the motor position and average frequency data after lubrication of the ball bearings of the ESG. The displacer 235 comprised a diameter of 90 mm of PTFE, having an area 64 cm$^2$, and a weight of 223 g.

On the ball bearings before lubrication test the servo motor position and average frequency were measured, where the displacer 235 was positioned in the air close to the servo gauge. The servo motor 245 moves the displacer 235 up and down in the air one full (complete) step per measurement. The displacer 235 is always hanging in the air, so the measured weight does not change except for a small amount due to the generally thin measuring wire 238. When the motor position increases the displacer 235 is pulled up.

FIG. 3A is a graph showing the motor position (left y-axis) and measured average frequency. An average frequency was calculated from 10 individual frequency measurements at the same motor position. Averaging is not necessary, although averaging reduces the small amount of noise in the frequency data. The frequency (right y-axis) is shown as a function of observation number (or time) on the x-axis. If the motor position increases, the displacer 235 moves upwards. FIG. 3A shows how the measured data has been gathered in time. In the FIG. 3B graph, the same data from FIG. 3A (motor position and measured average frequency) is shown, now plotted as a function of one another.

As shown in FIGS. 3A and 3B there is significant hysteresis when the motor changes direction. The average frequency change per motor step is shown as 0 Hz when the motor steps continuously in one direction. Because the displacer is moved up and down in air there is no change in force and thus no change in frequency. However, if the displacer is moved along the liquid interface, one would see a frequency change for every motor step in one direction. This can still provide information needed, making possible to measure the quality of the ball bearings.

On the "good ball bearings" (after bearing lubrication) test the motor position and average frequency were measured for the same displacer 235 as shown in FIGS. 3C and 3D. The lubrication of the main shaft ball bearings comprised adding sewing machine oil. In the FIG. 3C graph the motor position (left y-axis) and measured average frequency (right y-axis) are shown as a function of observation number (or time) on the x-axis. In the FIG. 3D graph, the same data from FIG. 3C (motor position and measured average frequency) is shown, now plotted as a function of one another.

FIGS. 3C and 3D (good ball bearings) evidence a number of changes compared to FIGS. 3A and 3B (bad ball bearings). The total hysteresis for the good ball bearings can be seen to be approximately ⅓ less than the bad ball bearings. The individual frequency steps for the good ball bearings are also smaller.

The above-described test evidences that the state of the ball bearings of the ESG can be monitored by regularly moving the displacer 235 up and down in the air at least one step in both directions and checking the difference between the minimum frequency and the maximum frequency for the up and down moves and/or the number of steps it takes to reach the minimum and maximum frequencies. As described above disclose automatic friction measurement for an ESG can be implemented in diagnostics for this ESG and for other ESGs.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method of measuring friction, comprising:
providing an electromechanical liquid level gauge that uses a servo principle (ESG) including a controller having a processor, a displacer suspended on a measuring wire from a measuring drum for causing a torque on said drum having a servo motor with a gear (motor) coupled by moving parts including a drive shaft, and ball bearings associated with said servo motor for rotating said drum arranged to balance a weight of said displacer in a tank, wherein a change in a level of a liquid in said tank (liquid level) causes a change in a counterforce to move said ESG out of balance, a force transducer positioned for measuring said torque on said drum and converting said torque into a physical quantity, wherein said processor includes an associated memory storing an automatic friction determination algorithm executed by said processor automatically implementing:
first moving said displacer in a first direction from an initial displacer position for at least one full step of said servo motor to reach at least a first displacer position;
obtaining first physical quantity data including at least a first physical quantity (Q1) measured by said force transducer while said displacer is at said first displacer position;
second moving said displacer in an opposite direction relative to said first direction for at least one full step of said servo motor to reach at least a second displacer position;
obtaining second physical quantity data including at least a second physical quantity (Q2) measured by said force transducer while said displacer is at said second displacer position;
determining a hysteresis measure from said first physical quantity data and said second physical quantity data;
further comprising generating a graph of a plurality of different positions of the servo motor versus torque for the servo motor, and
determining a condition of said ball bearings from whether said graph has a sawtooth pattern.

2. The method of claim 1, wherein said determining comprises calculating |said Q1–said Q2| to determine a hysteresis value.

3. The method of claim 2, further comprising automatically comparing said hysteresis value to at least one predetermined physical quantity value to classify a state of said ball bearings for determining whether to service said ESG.

4. The method of claim 1, wherein said at least one full step for said first moving and for said second moving both comprise a plurality of said full steps, and wherein said obtaining at least said Q1 and said obtaining at least said Q2 each comprise a physical quantity measurement at each of said plurality of said full steps.

5. The method of claim 1, wherein said second displacer position is set to said initial displacer position.

6. The method of claim 1, further comprising determining a friction measure from said hysteresis measure, and automatically correcting at least one measured liquid level value rendered by said ESG based on said friction measure.

7. The method of claim 1, wherein said physical quantity comprises frequency.

8. The method of claim 1, wherein said first displacer position and said second displacer position are both above said liquid level.

9. The method of claim 1, wherein said friction determination algorithm further provides a step of self-diagnosing a need for maintenance of said ball bearings.

10. An electromechanical liquid level gauge that uses a servo principle (ESG), comprising:
a controller having a processor;
a displacer having a negative buoyancy suspended on a measuring wire from a grooved measuring drum for causing a torque on said drum having a servo motor with a gear (motor) coupled by moving parts including a drive shaft and ball bearings associated with said servo motor for rotating said drum arranged to balance a weight of said displacer in a tank, wherein a change in a level of a liquid in said tank (liquid level) causes a change in a counterforce to move said ESG out of balance,
a force transducer positioned for measuring said torque on said drum and converting said torque into a physical quantity,
wherein said processor includes an associated memory storing an automatic friction determination algorithm (algorithm) when executed by said processor automatically implementing:
first moving said displacer in a first direction from an initial displacer position for at least one full step of said servo motor to reach at least a first displacer position;
obtaining first physical quantity data including at least a first physical quantity (Q1) measured by said force transducer while said displacer is at said first displacer position;
second moving said displacer in an opposite direction relative to said first direction for at least one full step of said servo motor to reach at least a second displacer position;
obtaining second physical quantity data including at least at least a second physical quantity (Q2) measured by said force transducer while said displacer is at said second displacer position, and
determining a hysteresis measure from said first physical quantity data and said second physical quantity;
further comprising generating a graph of a plurality of different positions of the servo motor versus torque for the servo motor, and
determining a condition of said ball bearings from whether said graph has a sawtooth pattern.

11. The ESG of claim 10, wherein said determining comprises calculating |said Q1–said Q2| to determine a hysteresis value.

12. The ESG of claim 11, further comprising said algorithm automatically comparing said hysteresis value to at least one predetermined frequency value to classify a state of said ball bearings.

13. The ESG of claim 10, wherein said at least one full step for said first moving and for said second moving both comprise a plurality of said full steps, and wherein said obtaining at least said Q1 and said obtaining at least said Q2 each comprise a physical quantity measurement at each of said plurality of said full steps.

14. The ESG of claim 10, wherein said second displacer position is set to said initial displacer position.

15. The ESG of claim 10, further comprising said algorithm determining a friction measure from said hysteresis measure and automatically correcting at least one measured liquid value rendered by said ESG based on said friction measure.

16. The ESG of claim 10, wherein said physical quantity comprises frequency.

\* \* \* \* \*